(12) United States Patent
Li et al.

(10) Patent No.: US 11,314,806 B2
(45) Date of Patent: Apr. 26, 2022

(54) METHOD FOR MAKING MUSIC RECOMMENDATIONS AND RELATED COMPUTING DEVICE, AND MEDIUM THEREOF

(71) Applicant: TENCENT TECHNOLOGY (SHENZHEN) COMPANY LIMITED, Shenzhen (CN)

(72) Inventors: Yan Li, Shenzhen (CN); Hanjie Wang, Shenzhen (CN); Hao Ye, Shenzhen (CN); Bo Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/026,477

(22) Filed: Sep. 21, 2020

(65) Prior Publication Data

US 2021/0004402 A1    Jan. 7, 2021

Related U.S. Application Data

(63) Continuation of application No. PCT/CN2019/098861, filed on Aug. 1, 2019.

(30) Foreign Application Priority Data

Aug. 14, 2018    (CN) .......................... 201810924409.0

(51) Int. Cl.
*G06F 16/30*    (2019.01)
*G06F 16/635*    (2019.01)
(Continued)

(52) U.S. Cl.
CPC ...... *G06F 16/635* (2019.01); *G06F 16/24578* (2019.01); *G06F 16/65* (2019.01);
(Continued)

(58) Field of Classification Search
CPC .. G06F 16/24578; G06F 16/635; G06F 16/65; G06F 16/686; G06F 17/00;
(Continued)

(56) References Cited

U.S. PATENT DOCUMENTS 7,558,800 B2    7/2009 Wada et al.
8,171,016 B2    5/2012 Van et al.
(Continued)

FOREIGN PATENT DOCUMENTS

CN    101727943 A    6/2010
CN    102637178 A    8/2012
(Continued)

OTHER PUBLICATIONS

Article entitled "Background Music Recommendation for Video Based on Multimodal Latent Semantic Analysis", by Kuo et al., dated 2013 (Year: 2013).*

(Continued)

*Primary Examiner* — Mahesh H Dwivedi
(74) *Attorney, Agent, or Firm* — Anova Law Group, PLLC

(57) ABSTRACT

This application discloses a method for making music recommendations. The method for making music recommendations is performed by a server device. The method includes obtaining a material for which background music is to be added; determining at least one visual semantic tag of the material, the at least one visual semantic tag describing at least one characteristic of the material; identifying a matched music matching the at least one visual semantic tag from a candidate music library; sorting the matched music according to user assessing information of a user corresponding to the material; screening the matched music based on a sorting result and according to a preset music screening (Continued)

condition; and recommending matched music obtained through the screening as candidate music of the material.

20 Claims, 10 Drawing Sheets

(51) Int. Cl.
| | |
|---|---|
| *G06F 16/65* | (2019.01) |
| *G06F 16/2457* | (2019.01) |
| *G06F 16/68* | (2019.01) |
| *G06F 40/279* | (2020.01) |
| *G06K 9/62* | (2022.01) |
| *G06N 3/04* | (2006.01) |
| *G06N 3/08* | (2006.01) |
| *G11B 27/036* | (2006.01) |
| *G06F 16/783* | (2019.01) |
| *G10H 1/36* | (2006.01) |
| *G10H 1/00* | (2006.01) |
| *G06V 20/40* | (2022.01) |

(52) U.S. Cl.
CPC ........ *G06F 16/686* (2019.01); *G06F 16/7837* (2019.01); *G06F 40/279* (2020.01); *G06K 9/6256* (2013.01); *G06N 3/04* (2013.01); *G06N 3/08* (2013.01); *G06V 20/46* (2022.01); *G10H 1/0008* (2013.01); *G10H 1/368* (2013.01); *G11B 27/036* (2013.01); *G10H 2220/441* (2013.01); *G10H 2240/085* (2013.01); *G10H 2240/141* (2013.01); *G10H 2250/311* (2013.01)

(58) Field of Classification Search
CPC .............. G06F 40/279; G06K 9/00744; G06K 9/6256; G06N 3/02; G06N 3/04; G06N 3/08; G10H 1/0008; G10H 1/368; G10H 2220/441; G10H 2240/085; G10H 2240/141; G10H 2250/311; G11B 27/036; G11B 27/11
See application file for complete search history.

(56) References Cited

U.S. PATENT DOCUMENTS

| | | | |
|---|---|---|---|
| 9,836,853 | B1 | 12/2017 | Médioni |
| 2007/0234214 | A1* | 10/2007 | Lovejoy ............... G11B 27/034 715/719 |
| 2011/0320454 | A1 | 12/2011 | Hill et al. |
| 2013/0025939 | A1 | 1/2013 | Heliot et al. |
| 2013/0077937 | A1 | 3/2013 | Kennedy et al. |
| 2014/0129507 | A1 | 5/2014 | Tanaka et al. |
| 2017/0025759 | A1 | 1/2017 | Lee et al. |
| 2017/0169349 | A1 | 6/2017 | Qi |
| 2017/0257595 | A1 | 9/2017 | Newell et al. |
| 2018/0096708 | A1* | 4/2018 | Choi ..................... G11B 27/34 |
| 2018/0151198 | A1 | 5/2018 | Yanagi |
| 2018/0226063 | A1 | 8/2018 | Wood et al. |
| 2019/0258671 | A1 | 8/2019 | Bou et al. |
| 2020/0098135 | A1 | 3/2020 | Ganjineh et al. |
| 2021/0012761 | A1* | 1/2021 | Song ..................... G10H 1/366 |

FOREIGN PATENT DOCUMENTS

| | | | |
|---|---|---|---|
| CN | 103605656 | A * | 2/2014 |
| CN | 103793447 | A | 5/2014 |
| CN | 103795897 | A | 5/2014 |
| CN | 105072354 | A | 11/2015 |
| CN | 105975472 | A | 9/2016 |
| CN | 107707828 | A | 2/2018 |
| CN | 108153831 | A | 6/2018 |
| CN | 109063163 | A | 12/2018 |
| EP | 1020843 | A1 | 7/2000 |
| EP | 1666967 | A1 | 6/2006 |
| JP | 2006099740 | A | 4/2006 |
| JP | 2009516951 | A | 4/2009 |
| JP | 2009266005 | A | 11/2009 |
| JP | 2014095966 | A | 5/2014 |
| KR | 101863672 | B1 | 6/2018 |
| WO | 2012004650 | A1 | 1/2012 |
| WO | 2018081751 | A1 | 5/2018 |
| WO | 2018104563 | A2 | 6/2018 |
| WO | 2018145015 | A1 | 8/2018 |

OTHER PUBLICATIONS

Article entitled "ADVISOR—Personalized Video Soundtrack Recommendation by Late Fusion with Heuristic Rankings", by Shah et al., dated Nov. 7, 2014 (Year: 2014).*
Article entitled "Collaborative Filtering for Music Recommender System", by Shakirova, Copyright 2017 (Year: 2017).*
Article entitled "A Music Video Recommender System Based on Emotion Classification on User Comments", by Sarakit dated 2015 (Year: 2015).*
Article entitled "Content-Aware Auto-Soundtracks for Personal Photo Music Slideshows", by Dunker et al., dated 2011 (Year: 2011).*
Article entitled "Semantic Based Background Music Recommendation for Home Videos" by Lin et al., dated 2014 (Year: 2014).*
The World Intellectual Property Organization (WIPO) International Search Report for PCT/CN2019/098861 dated Oct. 28, 2019 7 Pages (including translation).
The European Patent Office (EPO) Office Action 1 for for 19849335.5 dated May 5, 10, 2021 7 Pages (including translation).
The Japan Patent Office (JPO) Notification of Reasons for Refusal for Application No. 2020-549554 and Translation dated Nov. 8, 2021 11 Pages.

* cited by examiner

| Song | Comment |
|---|---|
| *Swan Goose* | Every time a train to home arrives at the Baotou station, this song is played on the radio, and hearing this song makes me feel that I am at home |
| | Stop singing, and I want to return to Hohhot province to eat chopped and cooked entrails when hearing this song |
| | Actually, there are other things besides grassland in Inner Mongolia. You are misled by CCTV News, and Inner Mongolia is very great |
| | Thoughts of far away places, and tears pour down my cheek |
| | Hometown of swan gooses and my home, Bayan Nur |
| *Mother* | Every time I hear this song, my tears burst out. That sometimes parents pass away before their children have a chance to repay their hard work in bringing them up is a regret in the whole life |
| | *Father* sung by Liu Hegang and *Mother* sung by Yan Weiwen show gratitude of children for their parents in the world |
| | Suddenly, I feel homesick |
| | This person is mommy |
| | This person is mother |
| *Female Soldiers* | Not being a solider is the most regretted thing in my life |
| | Always remember things happened in the military camp and the seventh division of the armed police force |
| | This song is taught by an instructor of the next class during military training in high school and I will never forget this song for the rest of my life |
| | A necessary song during military training |
| | Miss the army and my army comrades |

FIG. 3d

METHOD FOR MAKING MUSIC RECOMMENDATIONS AND RELATED COMPUTING DEVICE, AND MEDIUM THEREOF

RELATED APPLICATIONS

This application claims priority to PCT Application No. PCT/CN2019/098861, filed on Aug. 1, 2019, which claims priority to Chinese Patent Application No. 201810924409.0, entitled "METHOD FOR MAKING MUSIC RECOMMENDATIONS AND APPARATUS, TERMINAL DEVICE, AND MEDIUM THEREOF" and filed with the National Intellectual Property Administration, PRC on Aug. 14, 2018. The two applications are both incorporated herein by reference in their entirety.

FIELD OF THE TECHNOLOGY

This application relates to the field of computer technologies, and in particular, to a method for making music recommendations and related apparatus, a computing device, and a medium.

BACKGROUND OF THE DISCLOSURE

With the rising of various instant messaging applications, an increasing amount of materials are shared among application users. Simply sharing materials, such as images and videos, often cannot meet the requirements of the users, and adding background music for materials has become a new requirement. Generally, after the features of various materials and music features of music pieces are extracted, a matching relationship between the materials and the music is established according to the extracted features of the materials and music, which is used to recommend matched music for a material. The user may obtain many types of materials, such as images and videos, on the Internet, or videos or image sets recorded by the user.

However, recommendations can be performed for different users only according to a fixed matching relationship. It is difficult to provide a personalized service to the user.

SUMMARY

Embodiments of this application provide a making music recommendations and apparatus, a computing device, and a medium, to provide, when fewer processing resources of the computing device and bandwidth resources are used, a personalized recommendation service for different users when music matching a material is recommended to users.

One aspect of the present disclosure provides a method for making music recommendations. The method for making music recommendations is performed by a server device. The method includes obtaining a material for which background music is to be added; determining at least one visual semantic tag of the material, the at least one visual semantic tag describing at least one characteristic of the material; identifying a matched music matching the at least one visual semantic tag from a candidate music library; sorting the matched music according to user assessing information of a user corresponding to the material; screening the matched music based on a sorting result and according to a preset music screening condition; and recommending matched music obtained through the screening as candidate music of the material.

Another aspect of the present disclosure provides a non-transitory computer readable storage medium storing computer program that, when being executed by a processor, cause the processor to perform: obtaining a material for which background music is to be added; determining at least one visual semantic tag of the material, each visual semantic tag describing at least one characteristic of the material; identifying matched music matching the at least one visual semantic tag from a candidate music library; sorting the matched music according to user assessing information of a user corresponding to the material for the matched music; and screening the matched music based on a sorting result and according to a preset music screening condition, and recommending matched music obtained through the screening as candidate music of the material.

Another aspect of the present disclosure provides a computing device. The computer device includes at least one processing unit and at least one storage unit, the storage unit storing a computer program, the program, when executed by the processing unit, causing the processing unit to perform a method. The method includes obtaining a material for which background music is to be added; determining at least one visual semantic tag of the material, the at least one visual semantic tag describing at least one characteristic of the material; identifying a matched music matching the at least one visual semantic tag from a candidate music library; sorting the matched music according to user assessing information of a user corresponding to the material; screening the matched music based on a sorting result and according to a preset music screening condition; and recommending matched music obtained through the screening as candidate music of the material.

Other features and advantages of this application will be described in the subsequent specification, and partially become apparent from the specification, or be understood by implementing this application. Objectives and other advantages of this application may be implemented and obtained by using structures particularly mentioned in the specification, the claims, and the accompanying drawings.

BRIEF DESCRIPTION OF THE DRAWINGS

The accompanying drawings described herein are used to provide further understanding of this application, and form a part of this application. Exemplary embodiments of this application and descriptions thereof are used to explain this application, and do not constitute any inappropriate limitation to this application. In the accompanying drawings:

FIG. 3d is an exemplary diagram 2 of a type of user music comment according to an implementation of this application.

DESCRIPTION OF EMBODIMENTS

Figure 1:
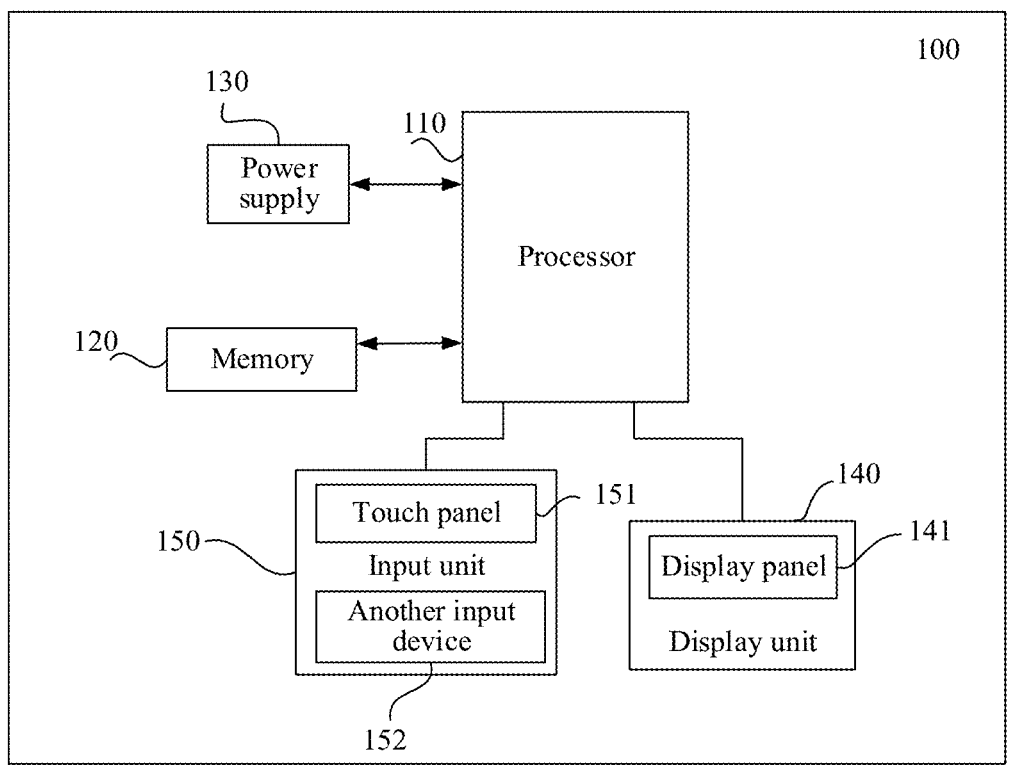
FIG. 1 is a schematic structural diagram of a terminal device according to an implementation of this application.

To provide personalized recommendation for different users when music matching a material is recommended to a user, the embodiments of this application provide a making music recommendations and apparatus, a computing device, and a medium.

First, some terms in the embodiments of this application are described for convenient understanding by a person skilled in the art.

1. Terminal device: an electronic device on which various applications may be installed and that can display entities provided in the installed applications, where the electronic device may be mobile, or may be fixed. For example, the terminal device may be a mobile phone, a tablet computer, an in-vehicle device, a personal digital assistant (PDA), or another electronic device that can implement the foregoing functions.

2. Convolutional neural network algorithm: an effective recognition method that has developed in recent years and that has attracted attention. In 1960s, when researching neurons used for local sensitivity and direction selection in a cat cortex, Hubel and Wiesel found that a unique network structure of the neurons may effectively reduce complexity of a feedback neural network, and further proposed a convolutional neural network (CNN). Nowadays, the CNN has become one of research hotspots in many scientific fields, and particularly in a mode classification field. In the network, complex pre-processing of an image at a previous stage is avoided, and an original image can be directly inputted. Therefore, the CNN is more widely applied.

3. Visual semantic tag vector: a vector representing probability distribution of one frame of image corresponding to tags and including scores of the frame of image corresponding to the tags. In the embodiments of this application, one score may be a probability value of one frame of image corresponding to one type of tag. One frame of image may be annotated with a plurality of tags.

4. Tag recognition model: a model used for recognizing an inputted image, and determining tags of the image.

5. Music search model: a model used for searching for music according to an inputted search word, to obtain music matching the search word.

6. FastText: an open-source word vector calculation and text classification tool from Facebook in 2016. Advantages of FastText are also very obvious. In a text classification task, FastText may achieve precision equivalent to a deep network, but a training time of FastText is shorter than that of the deep network by many orders of magnitude.

Because matched music is recommended by using a fixed matching relationship between materials and music, for a material inputted by a user, a differentiated service cannot be provided for different users. Therefore, the embodiments of this application provide a technical solution for music recommendations, including: determining visual semantic tags of a material, searching for matched music matching the visual semantic tags, and sorting and recommending the matched music according to user assessing information of the user for the matched music. Accordingly, differentiated recommendation can be provided for different users, and a personalized service can be provided for the user.

A making music recommendations according to an embodiment of this application may be applied to a terminal device. The terminal device may be a mobile phone, a tablet computer, a palmtop computer (such as a personal digital assistant (PDA)), or the like.

FIG. 1 is a schematic structural diagram of a terminal device 100. As shown in FIG. 1, the terminal device 100 includes a processor 110, a memory 120, a power supply 130, a display unit 140, and an input unit 150.

The processor 110 is a control center of the terminal device 100, connects components by using various interfaces and lines, and performs various functions of the terminal device 100 by running or executing a software program and/or data stored in the memory 120, thereby performing overall monitoring on the terminal device.

In one embodiment of the present disclosure, the processor 110 may include one or more processing units. The processor 110 may integrate an application processor and a modem. The application processor mainly processes an operating system, a user interface, an application, and the like. The modem mainly processes wireless communication. It may be understood that the modem may alternatively not be integrated into the processor 110. In some embodiments, the processor and the memory may be implemented on a single chip. In some other embodiments, the processor and the memory may be implemented on separate chips.

The memory 120 may mainly include a program storage area and a data storage area. The program storage area may store an operating system, various applications, and the like. The data storage area may store data created according to use of the terminal device 100. In addition, the memory 120 may include a high speed random access memory, and may also include a non-volatile memory, such as at least one magnetic disk storage device, a flash memory, or another non-volatile solid-state storage device.

The terminal device 100 further includes the power supply 130 (such as a battery) that supplies power to the components. The power supply may be logically connected to the processor 110 by using a power management system, thereby implementing functions such as charging, discharging, and power consumption management by using the power management system.

The display unit 140 may be configured to display information inputted by a user or information provided to a user, and various menus of the terminal device 100. In one embodiment of the present disclosure, the display unit 140 is mainly configured to display user interfaces of applications in the terminal device 100 and entities such as text and images displayed in the display interfaces. The display unit 140 may include a display panel 141. The display panel 141 may be configured in a form of a liquid crystal display (LCD), an organic light-emitting diode (OLED), or the like.

The input unit 150 may be configured to receive information such as digits or characters inputted by the user. The input unit 150 may include a touch panel 151 and another input device 152. The touch panel 151, also referred to as a touchscreen, may collect a touch operation of a user on or near the touch panel (such as an operation of a user on or near the touch panel 151 by using any suitable object or attachment, such as a finger or a touch pen).

Specifically, the touch panel 151 may detect a touch operation of the user, detect signals generated by the touch operation, convert the signals to touch point coordinates, transmit the touch point coordinates to the processor 110, and receive and execute a command transmitted from the processor 110. In addition, the touch panel 151 may be implemented in various types such as a resistive type, a capacitive type, an infrared type, and a surface acoustic wave type. The another input device 152 may include, but is not limited to, one or more of a physical keyboard, a functional key (such as a volume control key or a switch key), a track ball, a mouse, and a joystick.

Certainly, the touch panel 151 may cover the display panel 141. After detecting a touch operation on or near the touch panel 151, the touch panel 151 transfers the touch operation to the processor 110, to determine a type of a touch event. Then, the processor 110 provides a corresponding visual output on the display panel 141 according to the type of the touch event. In FIG. 1, the touch panel 151 and the display panel 141 implement, as two independent parts, input and output functions of the terminal device 100. However, in some embodiments, the touch panel 151 and the display panel 141 may be integrated to implement the input and output functions of the terminal device 100.

The terminal device 100 may further include one or more sensors, for example, a pressure sensor, a gravity acceleration sensor, and an optical proximity sensor. Certainly, according to requirements in specific applications, the terminal device 100 may further include other components such as a camera. The components are not key components that is used in one embodiment of the present disclosure. Therefore, the components are not shown in FIG. 1, and details are not described.

A person skilled in the art may understand that FIG. 1 shows an example of the terminal device, and does not constitute a limitation on the terminal device. In another embodiment, the terminal device may include more or fewer components than those shown in the figure, some components may be combined, or different components may be used.

In one embodiment of the present disclosure, the making music recommendations may alternatively be applied to a server device. Both the server device and the terminal device may use the structure shown in FIG. 1. The server device and the terminal device are collectively referred to as a computing device. The making music recommendations provided in one embodiment of the present disclosure may be applied to recommendation of matched music for various materials such as an image set and a video. The image set may include one or more images. The image or video may be shot by a user, or may be obtained in other manners.

Figure 2:
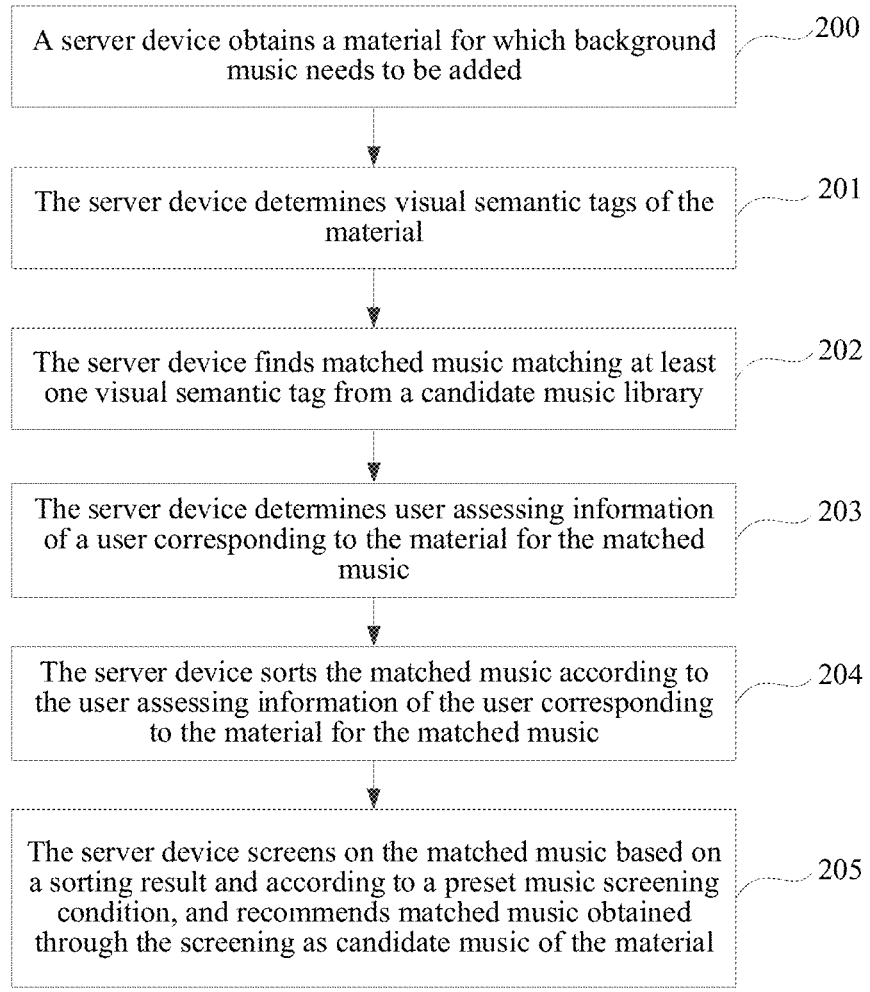
FIG. 2 is an implementation flowchart of a making music recommendations according to an implementation of this application.

FIG. 2 is an implementation flowchart of a making music recommendations according to an embodiment of this application, and the method is performed by a server device. A specific implementation process of the method includes step 200 to step 205, which are specifically as follows:

Step 200. A server device obtains a material for which background music needs to be added.

In one embodiment of the present disclosure, when step 200 is performed, the material may be a video or an image set, and the image set includes at least one frame of image.

The material of the server device may be obtained in the following manner: the server device receives a material for which background music is to be added and that is transmitted by a terminal device; or the server device directly obtains a material for which background music is to be added and that is inputted by a user; or the server device sets a material for which background music is to be added. The user may be a user of an instant messaging service (such as WeChat). The user may input various types of materials, such as a short material for which background music is to be added and that is shot in the Moments of WeChat, by using a terminal device of the user. Then, the terminal device transmits the short material to the server device through a communication network. In another example, the user directly uploads a material for which background music is to be added on an application interface provided by the server device. In still another example, the server device may alternatively actively search for materials that are uploaded by a user to a public platform, then add background music for the materials, and transmit the materials for which background music has been added to the user.

Step 201. The server device determines visual semantic tags of the material.

Specifically, step 201 may be performed in the following several manners:

A first manner is determining at least one visual semantic tag, designated by the user from available visual semantic tags, as at least one visual semantic tag of the material. For example, some available visual semantic tags may be provided for the user to select. The user designates at least one desired visual semantic tag from the visual semantic tags and submits the at least one visual semantic tag, and the at least one visual semantic tag designated by the user is determined as the at least one visual semantic tag of the material.

A second manner is parsing the content of the material, to determine at least one visual semantic tag of the material. For example, the content of a video or an image set is parsed, and at least one visual semantic tag of the material is determined according to a parsing result.

When the material is an image set, visual semantic tag recognition is performed on the material by using a pre-trained tag recognition model, to obtain visual semantic tag vectors of the material, and visual semantic tags of which scores meet a preset screening condition in the visual semantic tag vectors are determined as visual semantic tags corresponding to the material.

The image set includes at least one frame of image, the visual semantic tag vectors of the material include: at least one visual semantic tag of the content recognized from the material and a score corresponding to the at least one visual semantic tag, the tag recognition model is obtained after a plurality of tag recognition samples are trained, and each tag recognition sample includes a sample image and a visual semantic tag vector of the sample image.

If the material is a video, the following steps are performed:

First, the server device performs frame parsing on the material according to a preset duration, to obtain frames of images.

Then, the server device respectively performs visual semantic tag recognition on the frames of images by using a pre-trained tag recognition model, to obtain visual semantic tag vectors of the frames of images.

Finally, the server device determines an average vector of the visual semantic tag vectors of the frames of images, and determines visual semantic tags of which scores meet a preset screening condition in the average vector as visual semantic tags corresponding to the material.

A visual semantic tag vector of one frame of image includes: at least one visual semantic tag of content recognized from the frame of image and a score corresponding to the at least one visual semantic tag, the tag recognition model is obtained after a plurality of tag recognition samples are trained, and each tag recognition sample includes a sample image and a visual semantic tag vector of the sample image.

In one embodiment of the present disclosure, the preset duration may be 1 s. That is, one frame of image is parsed within 1 s. The screening condition may be screening a designated quantity of visual semantic tags having the highest scores. There may be one or more visual semantic tags.

For example, it is assumed that a visual semantic tag set includes: sky, mountain, sea, plant, animal, human, snow, light, and vehicle, and the designated quantity is 1. When an average vector is {0.7, 0.03, 0.1, 0.02, 0, 0, 0, 0.05, 0}, the server device determines a visual semantic tag corresponding to the material is sky having the highest score.

The tag recognition model is a model used for recognizing an inputted image, and determining tags of the image. The tag recognition model may be a model obtained after a large quantity of sample images and corresponding visual semantic tag vectors are trained, or may be a model established according to an association relationship between image features and visual semantic tags. A specific manner of obtaining the tag recognition model is not limited herein.

In one embodiment of the present disclosure, description is made by using an example in which the tag recognition model is obtained by training sample images and visual semantic tag vectors through a convolutional neural network algorithm.

Before step 201 is performed, the server device trains a large quantity of sample images and visual semantic tag vectors of the sample images in an image database by using a convolutional neural network algorithm in advance, to obtain the tag recognition model. The image database generally includes a ten-million level of image data.

A visual semantic tag vector represents probability distribution of one frame of image corresponding to tags and includes scores of the frame of image corresponding to the tags. In one embodiment of the present disclosure, one score may be a probability value of one frame of image corresponding to one type of tag. One frame of image may be annotated with a plurality of tags.

Figure 3A:
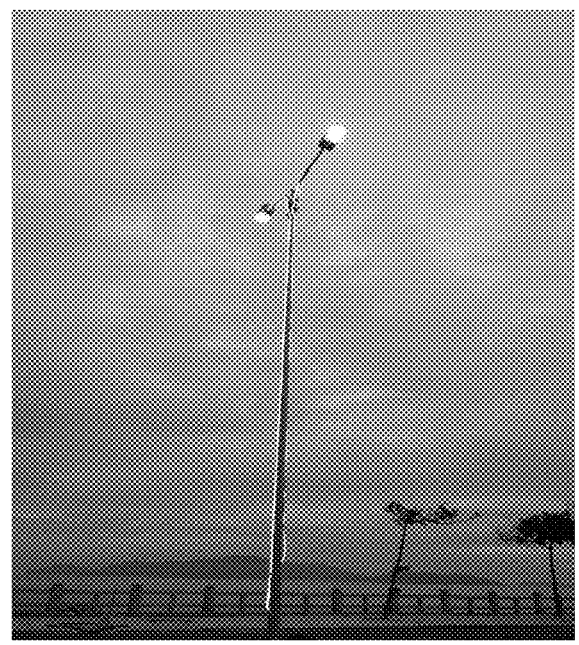
FIG. 3a is an exemplary diagram of a parsed image according to an implementation of this application.

For example, FIG. 3a is an exemplary diagram of a parsed image. It is assumed that a visual semantic tag set includes: sky, mountain, sea, plant, animal, human, snow, light, and vehicle. The server device determines that a visual semantic tag vector corresponding to the parsed image shown in FIG. 3a is {0.7, 0.03, 0.1, 0.02, 0, 0, 0, 0.05, 0}.

In one embodiment of the present disclosure, when a large quantity of sample images and visual semantic tag vectors of the sample images in an image database are trained, an Inception V1 or Inception V3 model in a CNN may be used, and Cross Entropy Loss may be used as a loss function, to determine similarities between obtained visual semantic tag vectors obtained through recognition and sample visual semantic tag vectors. Accordingly, model parameters in the training process may be constantly adjusted according to the determined similarities.

Figure 3B:
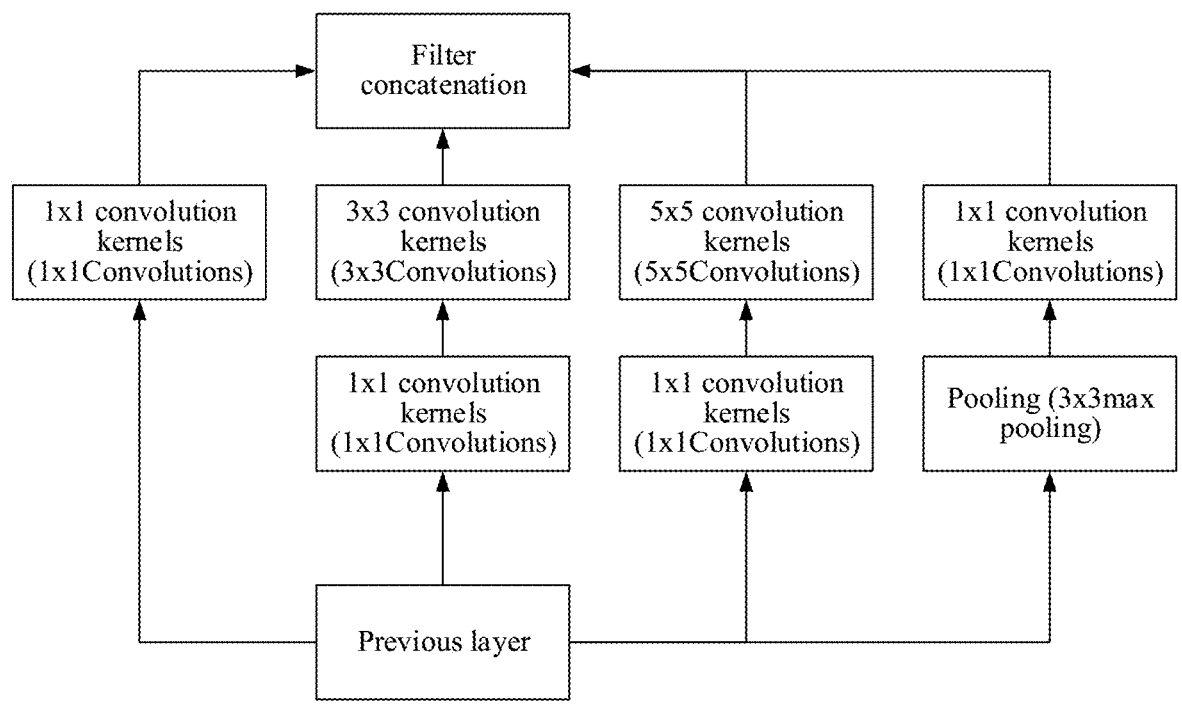
FIG. 3b is a schematic diagram of an Inception submodule of an Inception V1 model according to an implementation of this application.

For example, FIG. 3b is a schematic diagram of an Inception submodule of an Inception V1 model. A previous layer is used for obtaining an output value of the previous layer. 1×1, 3×3, and 5×5 are all convolution kernels. The Inception submodule performs convolution and pooling (such as 3×3 max pooling) on the output value of the previous layer through the convolution kernels, processes the output value through filter concatenation, and then outputs the output value to a next layer.

Accordingly, a large quantity of sample images and visual semantic tag vectors of the sample images in an image database may be trained in advance by using a convolutional neural network algorithm, to obtain the tag recognition model. When a material is a video, visual semantic tag recognition is respectively performed on frames of images by using a pre-trained tag recognition model, to obtain visual semantic tag vectors of the frames of images, and visual semantic tags corresponding to the material are determined according to probability distribution of the material corresponding to visual semantic tags. Therefore, visual semantic tags are marked on different materials, to explain the reason for music recommendation to a user by using the visual semantic tags. If a material for which background music is to be added is an image set, a tag recognition model is directly used to determine visual semantic tag vectors of the material, and visual semantic tags of the material are determined according to the visual semantic tag vectors.

Step 202. The server device identifies matched music matching at least one visual semantic tag from a candidate music library.

Specifically, the server device identifies the matched music matching the at least one visual semantic tag from the candidate music library based on the at least one visual semantic tag and by using a pre-trained music search model.

For example, a visual semantic tag is "missing my aged mother", and the server device identifies matched music matching "missing my aged mother" is Mother sung by Yan Weiwen from the candidate music library according to the music search model.

The music search model is a model used for searching for music according to an inputted search word, to obtain music matching the search word. The music search model may be obtained by using a text classification algorithm or an association relationship between text and music, or in another manner. A specific manner of obtaining the music search model is not limited herein. In one embodiment of the present disclosure, description is made by using an example in which the music search model is obtained through training on text and music by using a preset text classification algorithm.

In one embodiment of the present disclosure, before step 204 is performed, the server device may obtain the music search model after text training is performed based on music comment information of users for music and by using a preset text classification algorithm. The text classification algorithm is used for classifying text. Massive music comment information of users for songs may reflect themes and artistic conception of the songs, and different songs may have completely different comment styles.

Figure 3C:
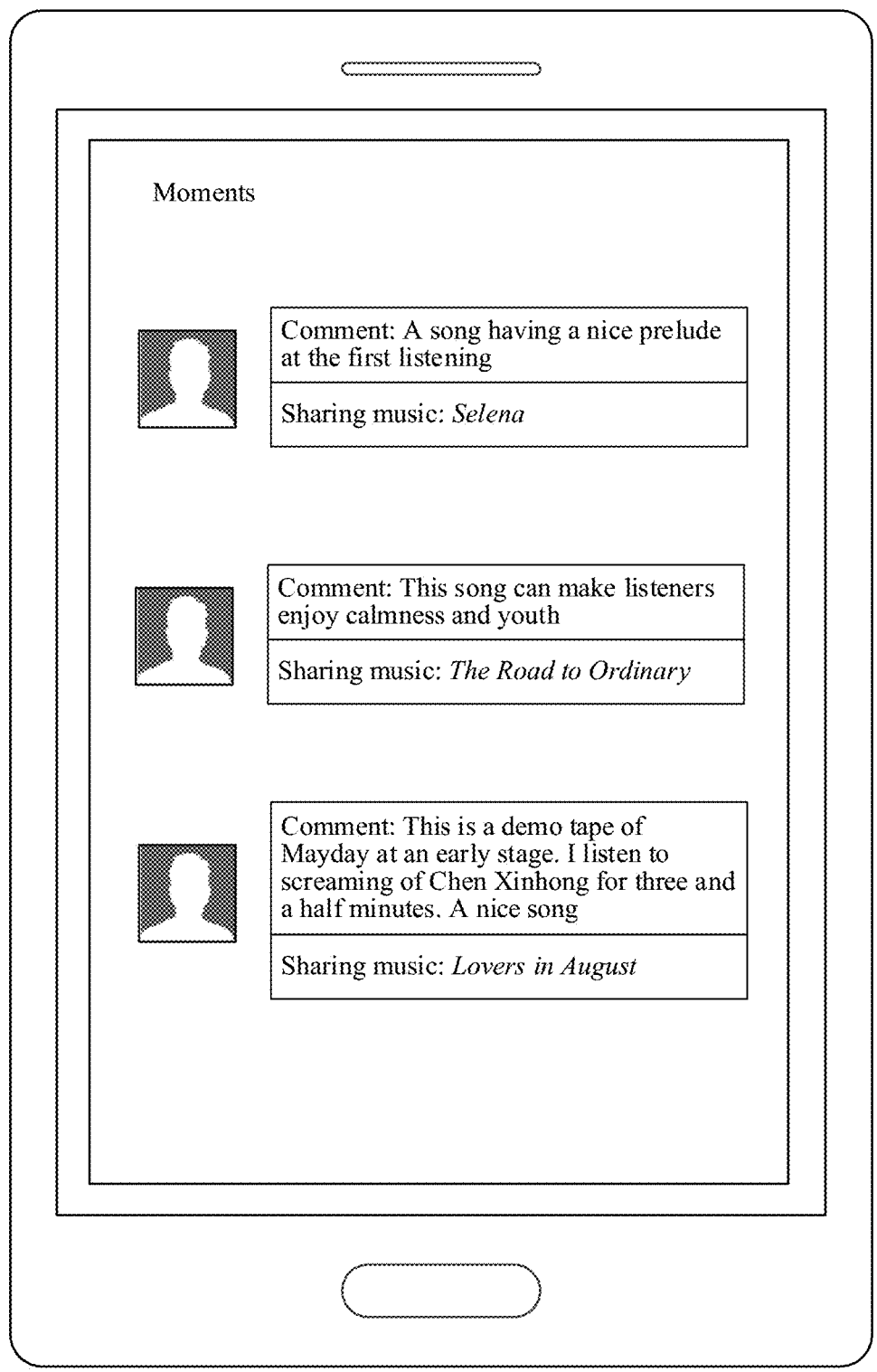
FIG. 3c is an exemplary diagram 1 of a type of user music comment according to an implementation of this application.

For example, FIG. 3c is an exemplary diagram 1 of a type of user music comment. In FIG. 3c, comments of users on music shared by the users in the Moments may be seen. FIG. 3d is an exemplary diagram 2 of a type of user music comment. In FIG. 3d, the three songs are respectively Swan Goose sung by Hu Sileng, Mother sung by Yan Weiwen, and Female Soldiers which is a military song. It may be obviously seen, according to music comment information of users, that comments on Swan Goose are mostly related to homesickness, hometown, Inner Mongolia, and North of Great Wall, comments on Mother are mostly related to gratitude of children for their mother and kindness of parents for their children, and comments on Female Soldiers mostly show memories of army life and military life.

Figure 3E:
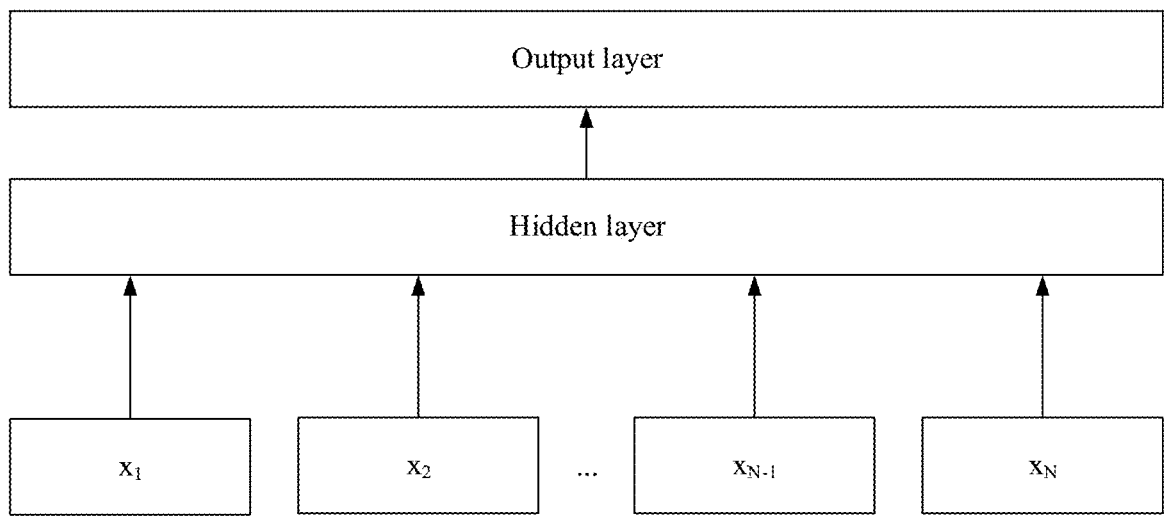
FIG. 3e is a schematic structural diagram of a model of FastText according to an implementation of this application.

In one embodiment of the present disclosure, the text classification algorithm may use FastText. FIG. 3e is a schematic structural diagram of a model of FastText. In FIG. 3e, an input layer $(x_1, x_2, \ldots, x_N)$ is used for inputting music comment information of a user. A hidden layer is used for generating a latent vector based on the inputted music comment information. An output lay is used for performing classification based on the hidden layer vector, that is, performing classification according to music.

In an optimized target function, larger likelihood estimation off enables higher music classification precision of FastText. An optimized target function of FastText is as follows:

$$\frac{1}{N}\Sigma_{n=1}^{N} y_n \log(f(BAx_n)),$$

where $x_n$ is music comment information of a user, $y_n$ is music, a matrix parameter A is a lookup table based on words, that is, embedded vectors of the words, and a mathematical meaning of an $Ax_n$ matrix operation is to add up or average the embedding vectors of the words. A matrix parameter B is a parameter of a function f, and the function f is a multi-classification linear function.

Accordingly, the music search model may be obtained after text training is performed based on music comment information of users for music and by using a preset text classification algorithm, and the matched music matching the visual semantic tags are found from the candidate music library by using the pre-trained music search model.

Step 203. The server device determines user assessing information of a user corresponding to the material for the matched music.

Specifically, step 203 may be performed in the following several manners.

A first method is obtaining music assessing behavior data of the user providing the material for the matched music, and using a weighted average value of one type of parameter value or a plurality of parameter values of the music assessing behavior data as the user assessing information.

A second method is that the server device predicts estimated music assessing information of the user for the matched music based on actual music assessing information of similar users of the user for the matched music, and uses the estimated music assessing information as the user assessing information.

A third method is that the server device obtains an estimated evaluation matrix that is pre-determined, directly obtains estimated music assessing information of the user for the matched music in the estimated evaluation matrix, and uses the estimated music assessing information as the user assessing information.

In an actual application, corresponding priorities may be set for various manners. In one embodiment of the present disclosure, a priority order of the manners is not limited.

Specifically, the second manner may be performed by using the following steps:

First, the server device obtains user attribute information of users assessing the matched music, and obtains, through screening, similar users of which user attribute information is similar to user attribute information of the user inputting the material.

Then, the server device obtains actual music assessing information of the similar users for the matched music.

Finally, the server device respectively performs mean processing on the actual music assessing information of the similar users for the matched music, to obtain the estimated music assessing information of the user for the matched music.

In one embodiment of the present disclosure, the server device sorts the matched music according to estimated music assessing information of the user corresponding to the material for the matched music, the estimated music assessing information of the user for the matched music being obtained based on actual music assessing information of different users for candidate music. In another embodiment of this application, the server device sorts the matched music according to parameter values of one type of music assessing behavior data of the user corresponding to the material for music, or a comprehensive value obtained after weighted processing is performed on parameter values of at least two types of music assessing behavior data of the user for music.

The user attribute information is used for describing features of the user. In one embodiment of the present disclosure, the user attribute information may include a gender, an age, an education background, and a job. Actual music assessing information of one user for one piece of music is obtained after weighted processing is performed on parameter values included in music assessing behavior data of the user. The music assessing behavior data includes any one of or any combination of the following parameters: a music score, a click-through rate, a favorites behavior, a like behavior, and a sharing behavior.

Accordingly, estimated music assessing information of the user for the matched music may be predicted according to actual music assessing information of similar users of the user for the matched music, so that the matched music may be recommended to the user according to the actual music assessing information of the similar users.

When the third manner is used and before step 203 is performed, the server device determines an estimated evaluation matrix in advance based on actual music assessing information of users for candidate music in the candidate music library.

Specifically, the estimated evaluation matrix may be determined by using the following steps.

First, the server device forms a score matrix based on actual music assessing information of users for candidate music. An element $m_{ij}$ in the score matrix represents a value corresponding to assessing of a user i for music j.

Then, the server device performs matrix decomposition on the score matrix by using a preset matrix decomposition algorithm, to obtain a user matrix and a music feature matrix.

Finally, the server device determines a transposition of each music feature vector in the music feature matrix and a product of each user vector in the user matrix as estimated music assessing information of each user for each piece of music.

In one embodiment of the present disclosure, the matrix decomposition algorithm may use a FunkSVD algorithm, and a specific principle is as follows:

When matrix decomposition is performed on the score matrix, it is expected that the score matrix is factorized according to the formula $M_{m\times n}=P_{m\times k}^T Q_{k\times n}$. M is a score matrix, P is a user matrix, Q is a music feature matrix, m is a total quantity of users, n is a total quantity of music, and k is a parameter. Accordingly, based on P and Q obtained after the matrix decomposition, an estimated music score of the user i for the music j may be represented by using $q_j^T p_i$, p is a user vector, and q is a music feature vector.

To reduce a score residual between an actual music score $m_{ij}$ of the user and the estimated music score $q_j^T p_i$ obtained through calculation as much as possible, a mean square error is used as a loss function, to determine final P and Q.

That is, provided that the loss function may be minimized, that is, $\Sigma_{i,j}(m_{ij}-q_j^T p_i)^2$, and $p_i$ and $q_j$ corresponding to an extreme value may be solved, the matrices P and Q may be finally obtained. Therefore, for any location without a score in any matrix M, a music score may be predicted through calculation by using $q_j^T p_i$.

In an actual application, to avoid over-fitting, a regularization item is added. Therefore, the optimized target function J(p,q) is as follows:

$$J(p, q) = \min_{p_i, q_j} \sum_{i,j} (m_{ij} - q_j^T p_i)^2 + \lambda(\|p_i\|_2^2 + \|q_j\|_2^2),$$

where p is a user vector, q is a music feature vector, λ is a regularization coefficient, i is a user sequence number, and j is a music sequence number.

Because λ is the regularization coefficient, a parameter needs to be adjusted. Therefore, optimization is performed by using a gradient descent method to obtain a result, and specific steps are as follows:

First, for the foregoing formula, respectively take the derivative of $p_i$ and $q_j$ and obtain:

$\partial J/\partial p_i = -2(m_{ij}-q_j^T p_i)q_j + 2\lambda p_i$; and $\partial J/\partial q_j = -2(m_{ij}-q_j^T p_i)p_i + 2\lambda q_j$.

Then, when iteration of the gradient descent method is performed, iteration formulas are as follows:

$p_i = p_i + \alpha((m_{ij}-q_j^T p_i)q_j - \lambda p_i)$; and $q_j = q_j + \alpha((m_{ij}-q_j^T p_i)p_i - \lambda q_j)$.

Through the iteration, optimized user matrix P and music feature matrix Q may be finally obtained. Therefore, an estimated evaluation matrix of each user for each piece of music is determined based on a product of each $q_j^T$ in Q and each $p_i$ in P.

Accordingly, a score matrix may be obtained according to actual music assessing information of users for candidate music, and a user matrix and a music feature matrix are obtained through matrix decomposition. Therefore, estimated evaluation matrices of the users for the music are obtained based on the user matrix and the music feature matrix, and the estimated evaluation matrices are determined as estimated music assessing information of the users for the candidate music.

Step 204. The server device sorts the matched music according to the user assessing information of the user corresponding to the material for the matched music.

Step 205. The server device performs screening on the matched music based on a sorting result and according to a preset music screening condition, and recommends matched music obtained through the screening as candidate music of the material.

Specifically, the server device obtains, through screening and according to an order, matched music meeting a preset music screening condition from the matched music, and directly displays, according to an order, candidate music obtained through screening to the user or transmits information about candidate music to the terminal device.

In one embodiment of the present disclosure, the music screening condition may be obtaining, through screening, matched music of which user assessing information has a value greater than a set value, or obtaining, through screening and according to a descending sorting result, matched music of which sequence numbers are greater than a set value, or screening a specific quantity of matched music.

Accordingly, the user may select music that the user likes from the candidate music to add background music for the material.

Figure 3F:
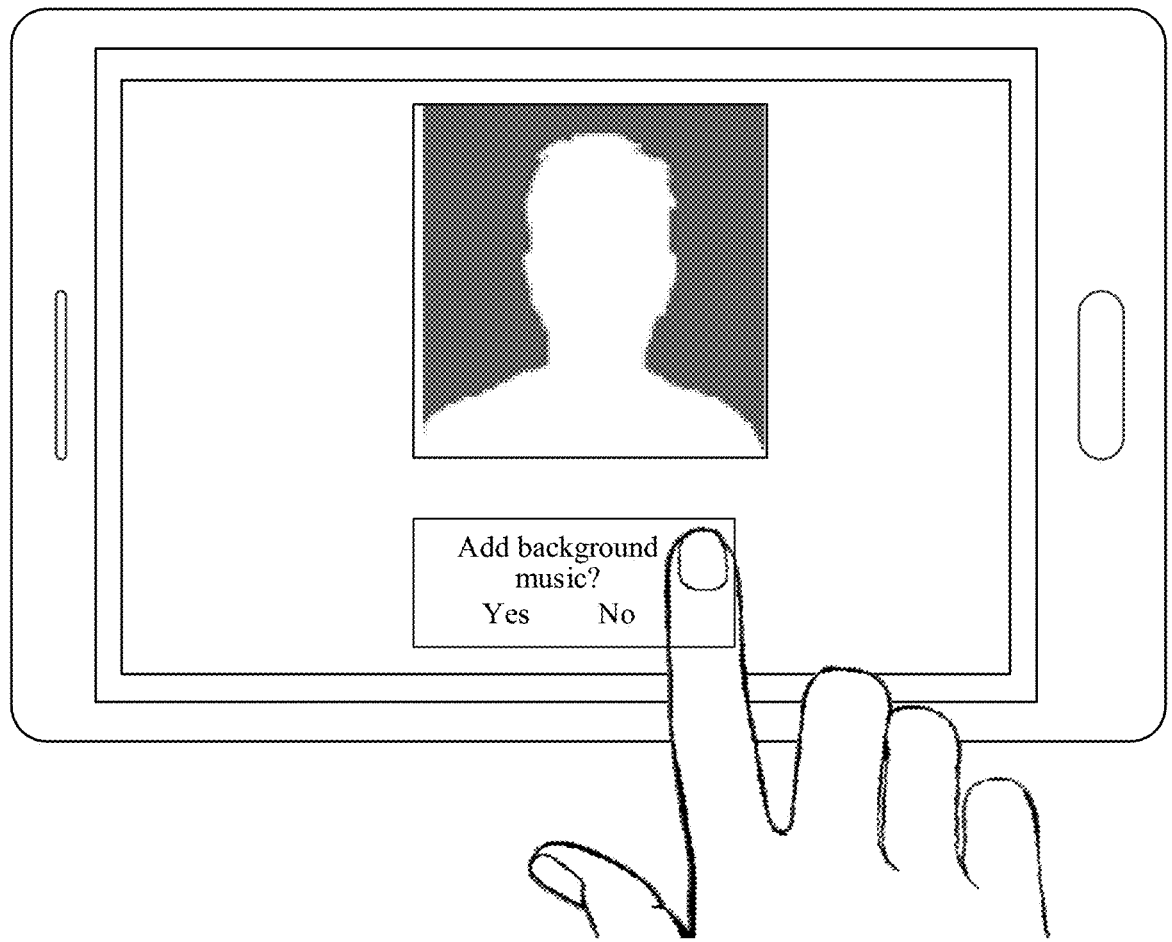
FIG. 3f is a schematic diagram 1 of a music recommendation application interface according to an implementation of this application.
Figure 3G:
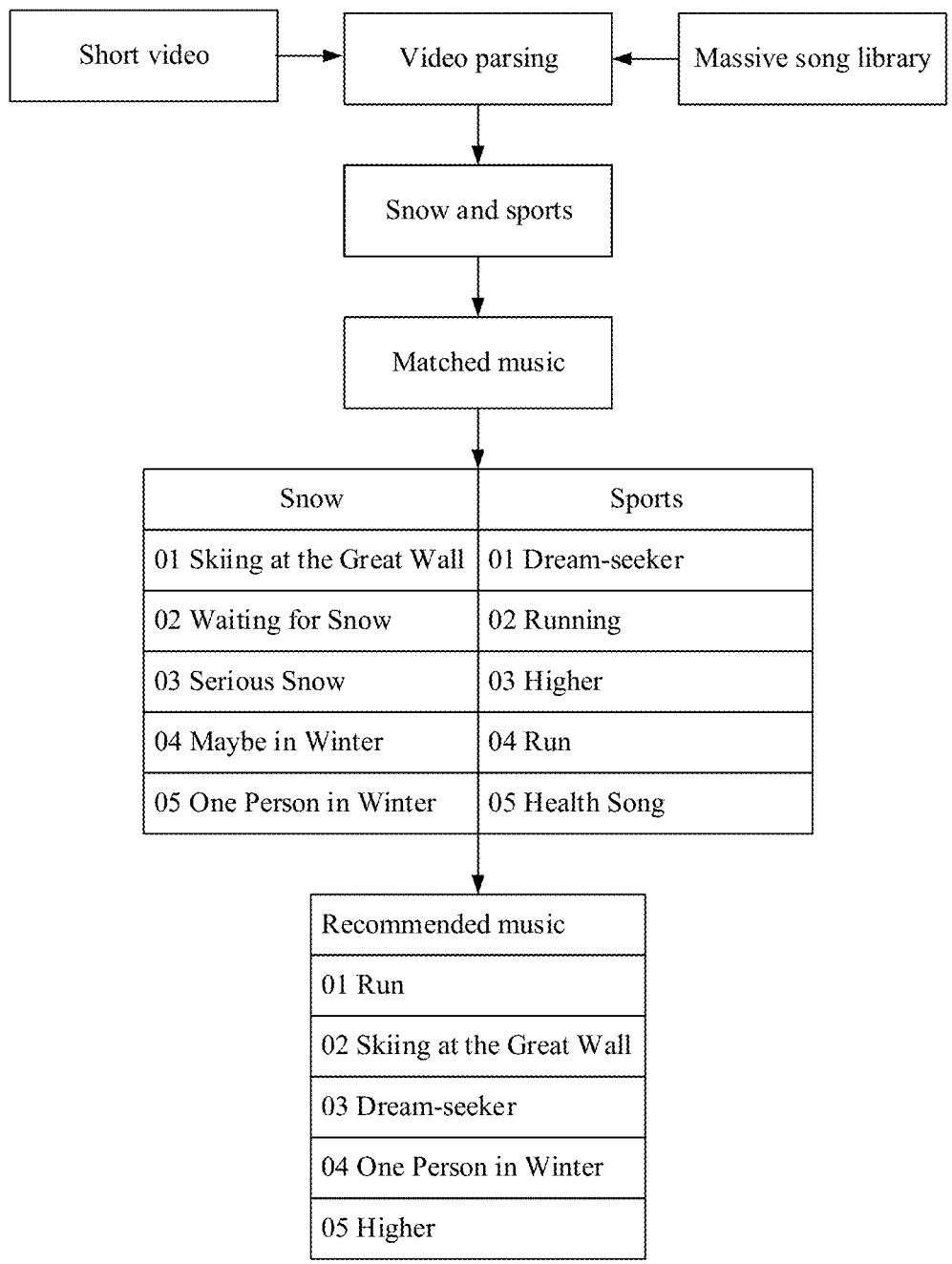
FIG. 3g is an exemplary diagram of recommending matched music for a material according to an implementation of this application.
Figure 3H:
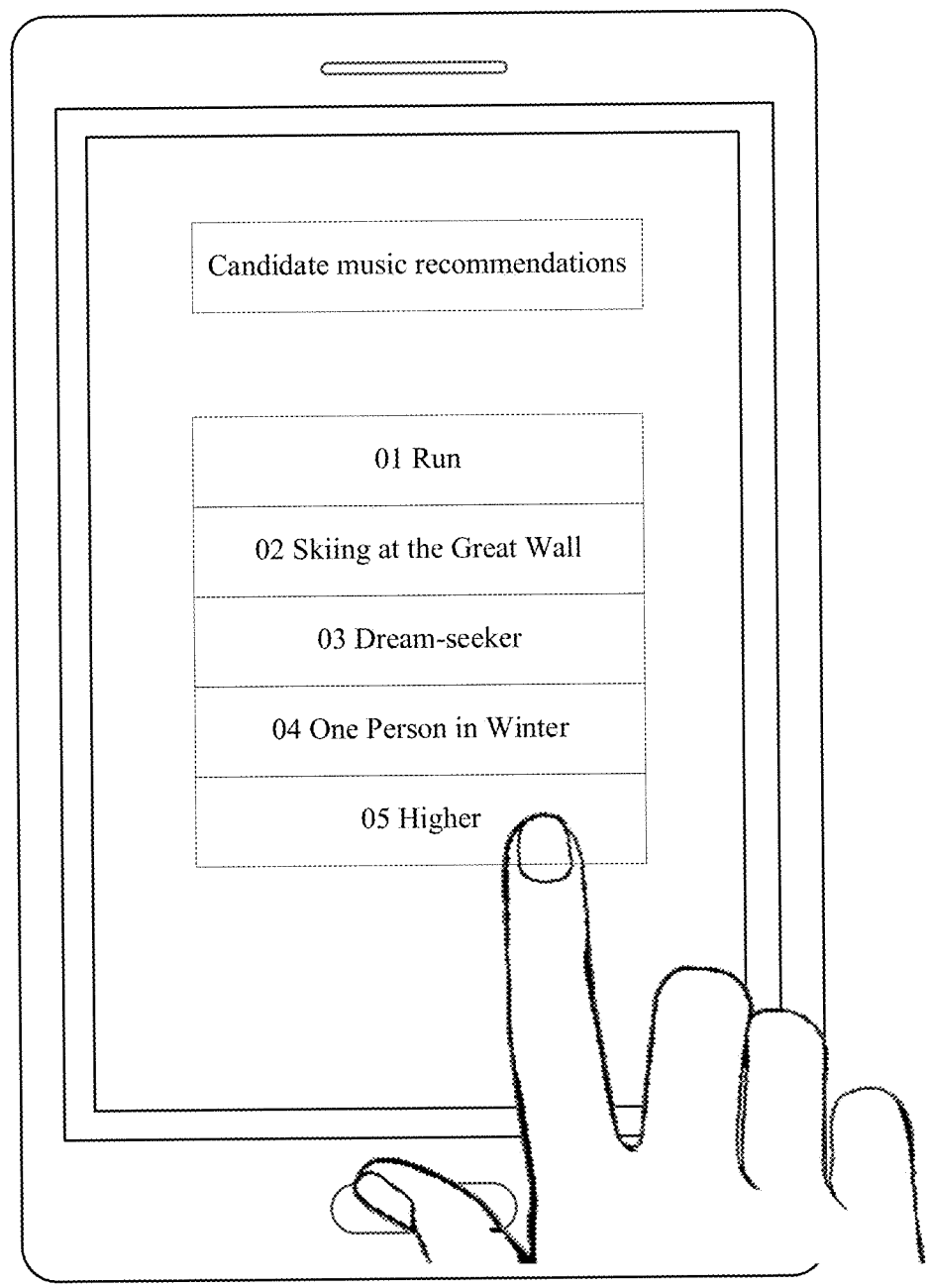
FIG. 3h is a schematic diagram 2 of a music recommendation application interface according to an implementation of this application.
Figure 5:
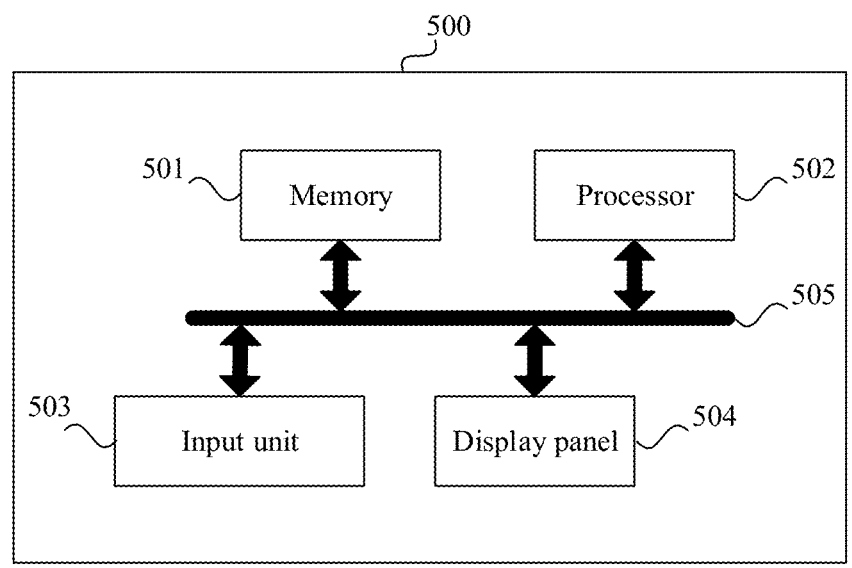
FIG. 5 is a schematic structural diagram of a terminal device according to an implementation of this application.

For example, FIG. 3f is a schematic diagram 1 of a music recommendation application interface. In FIG. 3f, the terminal device asks the user whether to add background music for a short video. FIG. 3g is an exemplary diagram of recommending matched music for a material. In FIG. 3g, when determining that the user adds background music for the short video, the terminal device transmits the short video to the server device. The server device parses the short video, and determines that visual semantic tags of the short video are snow and sports. Then, the server device identifies 5 songs matching snow and 5 songs matching sports in a massive song library (the candidate music library). Subsequently, the server device sorts the songs according to estimated music assessing information of the user for the 10 songs. FIG. 3h is a schematic diagram 2 of a music recommendation application interface. In FIG. 3h, 5 songs ranking top are recommended to the user according to an order.

Further, the terminal device receives information about candidate music returned by the server device, displays the information about the candidate music to the user, determines that indication information of the user designating background music from the candidate music is received, and obtains and outputs, according to the indication information, the material synthesized with the background music.

When the material synthesized with the background music is obtained according to the indication information, the following two manners may be used.

A first method is transmitting the indication information to the server device, and receiving the material synthesized with the background music returned by the server device.

A second method is transmitting the indication information to the server device, receiving background music returned by the server device according to the indication information, and synthesizing the background music to the material. For example, the server device receives indication information that is transmitted by the terminal device and that designates background music from the candidate music, synthesizes the background music to the material according to the indication information, and transmits the material synthesized with music to the terminal device.

In one embodiment of the present disclosure, several visual semantic tags of a material are determined, some matched music matching the visual semantic tags is searched for by using a music search model obtained by using music comment information of users for music, the matched music is sorted based on user assessing information of a user, and music is recommended to the user according to a sorting result. Accordingly, a personalized service may be performed according to preference of different users for different music, that is, differentiated recommendation is performed on different users. Therefore, not only music matching the material is recommended to the user, but also music that the user likes is recommended to the user.

An embodiment of this application further provides a making music recommendations, performed by a terminal device.

The terminal device transmits a material for which background music is to be added to a server device, to trigger the server device to perform the following operations: determining at least one visual semantic tag of the material; identifying matched music matching the at least one visual semantic tag from a candidate music library; sorting the matched music according to estimated music assessing information of a user corresponding to the material for the matched music; and performing screening on the matched music based on a sorting result and according to a preset music screening condition, and recommending matched music obtained through the screening as candidate music of the material. Then, the terminal device receives the candidate music returned by the server device. The estimated music assessing information of the user for the matched music is obtained based on actual music assessing information of different users for candidate music.

Figure 3I:
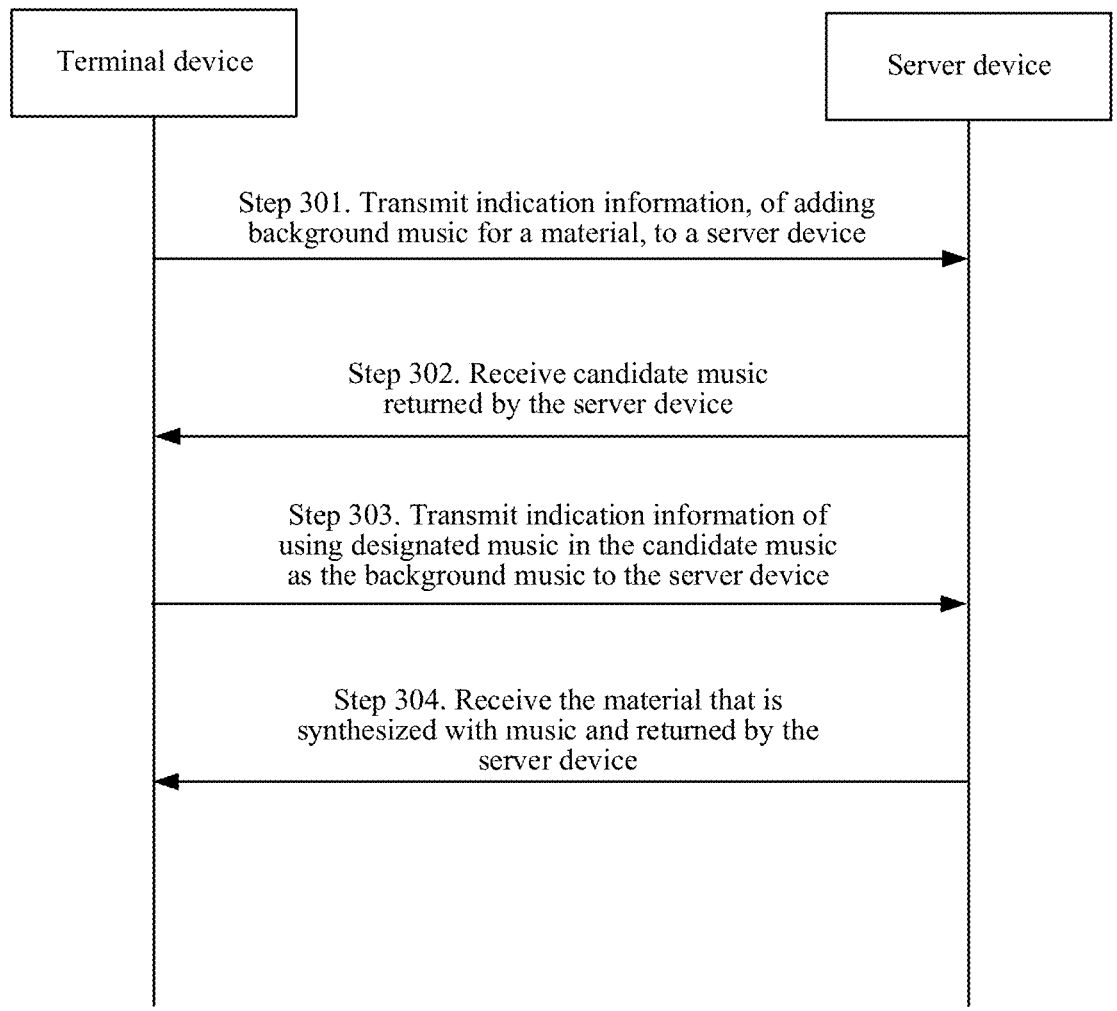
FIG. 3i is an information exchange diagram according to an implementation of this application.

FIG. 3i is an interaction sequence diagram of adding background music. A specific implementing process of the method is as follows.

Step 301. A terminal device transmits indication information, of adding background music for a material, to a server device.

Step 302. The terminal device receives candidate music that is returned by the server device and that is recommended based on the material.

Step 303. The terminal device transmits indication information of using designated music in the candidate music as the background music to the server device.

Step 304. The terminal device receives the material that is synthesized with music and returned by the server device.

Based on the same inventive concept, an embodiment of this application further provides a music recommendation apparatus. Because the principle for the apparatus and device to resolve the problem is similar to that of the foregoing making music recommendations, for implementation of the apparatus, reference may be made to the implementation of the foregoing method. Repeated content is not described herein again.

Figure 4A:
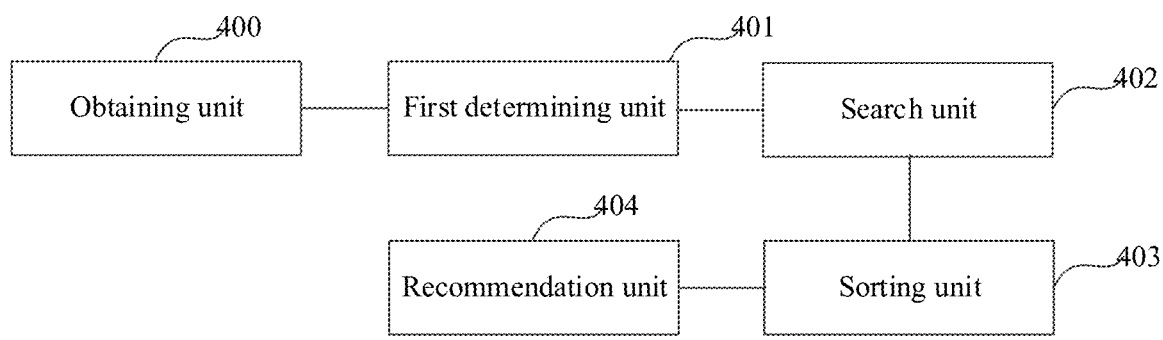
FIG. 4a is a schematic structural diagram 1 of a music recommendation apparatus according to an implementation of this application.

FIG. 4a is a schematic structural diagram 1 of a music recommendation apparatus according to an embodiment of this application, and the apparatus includes: an obtaining unit 400, configured to obtain a material for which background music is to be added; a first determining unit 401, configured to determine at least one visual semantic tag of the material, each visual semantic tag being used for describing at least one characteristic of the material; a search unit 402, configured to identify matched music matching the at least one visual semantic tag from a candidate music library; a sorting unit 403, configured to sort the matched music according to user assessing information of a user corresponding to the material for the matched music; and a recommendation unit 404, configured to perform screening on the matched music based on a sorting result and according to a preset music screening condition, and recommend matched music obtained through the screening as candidate music of the material.

In one embodiment of the present disclosure, the recommendation unit 404 is further configured to: receive indication information that is transmitted by a terminal device and that designates background music from the candidate music; synthesize the background music to the material according to the indication information; and transmit the material synthesized with music to the terminal device.

In one embodiment of the present disclosure, the first determining unit 401 further includes: a second determining unit, configured to determine at least one visual semantic tag, designated by the user from available visual semantic tags, as the at least one visual semantic tag of the material; or a parsing unit, configured to parse content of the material, to determine the at least one visual semantic tag of the material.

In one embodiment of the present disclosure, the parsing unit is specifically configured to: perform visual semantic tag recognition on the material by using a pre-trained tag recognition model when the material is an image set, to obtain visual semantic tag vectors of the material, and determine visual semantic tags of which scores meet a preset screening condition in the visual semantic tag vectors as visual semantic tags corresponding to the material. The image set includes at least one frame of image. The visual semantic tag vectors of the material including: at least one visual semantic tag of the content recognized from the material and a score corresponding to the at least one visual semantic tag, the tag recognition model being obtained after a plurality of tag recognition samples are trained, and each tag recognition sample including a sample image and a visual semantic tag vector of the sample image.

In one embodiment of the present disclosure, the parsing unit is specifically configured to: perform frame parsing on the material when the material is a video, to obtain frames of images; respectively perform visual semantic tag recognition on the frames of images by using a pre-trained tag recognition model, to obtain visual semantic tag vectors of the frames of images; and determine an average vector of the visual semantic tag vectors of the frames of images, and determine visual semantic tags of which scores meet a preset screening condition in the average vector of the visual semantic tag vectors of the frames of images as visual semantic tags corresponding to the material, a visual semantic tag vector of one frame of image including: at least one visual semantic tag of content recognized from the frame of image and a score corresponding to the at least one visual semantic tag, the tag recognition model being obtained after a plurality of tag recognition samples are trained, and each tag recognition sample including a sample image and a visual semantic tag vector of the sample image.

In one embodiment of the present disclosure, the search unit 402 is specifically configured to: obtain the matched music matching the at least one visual semantic tag based on the at least one visual semantic tag and by using a pre-trained music search model. The music search model is obtained after text classification training is performed on music comment information of users for music.

In one embodiment of the present disclosure, the sorting unit 403 is specifically configured to: sort the matched music according to estimated music assessing information of the user corresponding to the material for the matched music, the estimated music assessing information of the user for the matched music being obtained based on actual music assessing information of different users for candidate music, where actual music assessing information of one user for one piece of music is obtained after weighted processing is performed on parameter values included in music assessing behavior data of the user; and the music assessing behavior data includes any one of or any combination of the following parameters: a music score, a click-through rate, a favorites behavior, a like behavior, and a sharing behavior.

In one embodiment of the present disclosure, the sorting unit 403 is specifically configured to: obtain, for the matched music, user attribute information of users assessing the matched music, and obtain, through screening, similar users of which user attribute information is similar to user attribute information of the user inputting the material; obtain actual music assessing information of the similar users for the matched music; and respectively perform mean processing on the actual music assessing information of the similar users for the matched music, to obtain the estimated music assessing information of the user for the matched music.

In one embodiment of the present disclosure, the sorting unit 403 is specifically configured to: obtain a score matrix based on actual music assessing information of users for candidate music; perform matrix decomposition and optimization processing on the score matrix, to obtain a user matrix and a music feature matrix; and determine a transposition of each music feature vector in the music feature matrix and a product of each user vector in the user matrix as estimated music assessing information of each user for each piece of music.

The sorting unit 403 is specifically configured to: sort the matched music according to parameter values of one type of music assessing behavior data of the user corresponding to the material for music, or a comprehensive value obtained after weighted processing is performed on parameter values of at least two types of music assessing behavior data of the user for music, music assessing behavior data of one user for one piece of music including any one of or any combination of the following parameters: a music score, a click-through rate, a favorites behavior, a like behavior, and a sharing behavior.

Figure 4B:
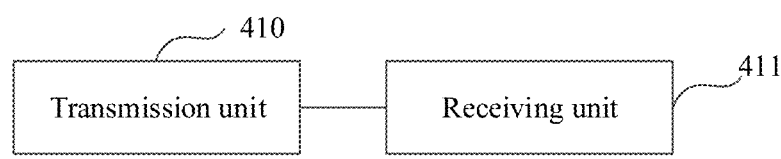
FIG. 4b is a schematic structural diagram 2 of a music recommendation apparatus according to an implementation of this application.

FIG. 4b is a schematic structural diagram 2 of a music recommendation apparatus according to an embodiment of this application, and the apparatus includes: a transmission unit 410, configured to transmit a material for which background music is to be added to a server device, to trigger the server device to perform the following operations: determining at least one visual semantic tag of the material; identify matched music matching the at least one visual semantic tag from a candidate music library; sort the matched music according to estimated music assessing information of a user corresponding to the material for the matched music; and perform screening on the matched music based on a sorting result and according to a preset music screening condition, and recommend matched music obtained through the screening as candidate music of the material; and a receiving unit 411, configured to receive the candidate music returned by the server device, the estimated music assessing information of the user for the matched music being obtained based on actual music assessing information of different users for candidate music.

Based on the same technical concept, an embodiment of this application further provides a computing device, including at least one processing unit and at least one storage unit, the storage unit storing a computer program, the program, when executed by the processing unit, causing the processing unit to perform operations of the method described in the foregoing embodiments.

In one embodiment of the present disclosure, the computing device may be a server device or a terminal device. Both the server device and the terminal device may use the structure shown in FIG. 5. The structure of the computing device is described below by using a terminal device as an example. An embodiment of this application provides a terminal device 500. Referring to FIG. 5, the terminal device 500 is configured to implement the method described in the foregoing method embodiments, for example, implement the embodiment shown in FIG. 2. The terminal device 500 may include a memory 501, a processor 502, an input unit 503, and a display panel 504.

The memory 501 is configured to store a computer program executed by the processor 502. The memory 501 may mainly include a program storage area and a data storage area. The program storage area may store an operating system, various applications required by at least one function, and the like. The data storage area may store data created according to use of the terminal device 500. The processor 502 may be a central processing unit (CPU), a digital processing unit, or the like. The input unit 503 may be configured to obtain a user instruction inputted by a user. The display panel 504 is configured to display information inputted by the user or information provided to the user. In one embodiment of the present disclosure, the display panel 504 is mainly configured to display user interfaces of applications in the terminal device and control entities displayed in the display interfaces. In one embodiment of the present disclosure, the display panel 504 may be configured in a form of an LCD, an OLED, or the like.

In one embodiment of the present disclosure, a specific connection medium between the memory 501, the processor 502, the input unit 503, and the display panel 504 is not limited. In one embodiment of the present disclosure, in FIG. 5, the memory 501, the processor 502, and the input unit 503, and the display panel 504 are connected to each other through a bus 505. The bus 505 is represented by using a bold line in FIG. 5. A manner of connection between other components is only schematically described, but is not used as a limitation. The bus 505 may be classified into an address bus, a data bus, a control bus, and the like. For ease of indication, the bus in FIG. 5 is represented by using only one bold line, but it does not indicate that there is only one bus or one type of bus.

The memory 501 may be a volatile memory such as a random-access memory (RAM). Alternatively, the memory 501 may be a non-volatile memory, such as a read-only memory, a flash memory, a hard disk drive (HDD), or a solid-state drive (SSD). Alternatively, the memory 501 is any other medium that can be used to carry or store expected program code having an instruction or data structure form and that can be accessed by a computer, but is not limited thereto. The memory 501 may be a combination of the foregoing memories.

The processor 502 is configured to implement the embodiment shown in FIG. 2, including: the processor 502 being configured to invoke a computer program stored in the memory 501 to implement the embodiment shown in FIG. 2.

An embodiment of this application further provides a computer-readable storage medium, storing a computer-executable instruction used for performing steps required to be performed by the foregoing processor. The computer-executable instruction includes a program used for performing steps required to be performed by the foregoing processor. For example, the storage medium stores a computer program executable by a computing device, the program, when run on the computing device, causing the computing device to perform the steps of the method described in the foregoing embodiments.

In some possible implementations, the aspects of the making music recommendations provided in this application may be further implemented in a form of a program product, including program code. When the program product is run on a terminal device, the program code is used for causing the terminal device to perform the steps in the making music recommendations according to various exemplary implementations of this application. For example, the terminal device may implement the embodiment shown in FIG. 2.

The program product may be any combination of one or more readable mediums. The readable medium may be a readable signal medium or a readable storage medium. The readable storage medium may be, for example, but is not limited to, an electric, magnetic, optical, electromagnetic, infrared, or semi-conductive system, apparatus, or component, or any combination of the above. More specific examples of the readable storage medium (a non-exhaustive list) include: an electrical connection having one or more wires, a portable computer magnetic disk, a hard disk, a RAM, a ROM, an erasable programmable ROM (EPROM or a flash memory), an optical fiber, a compact disc read-only memory (CD-ROM), an optical storage device, a magnetic storage device, or any appropriate combination thereof.

The program product used for music recommendation according to an implementation of this application may use a CD-ROM, include program code, and may be run on a computing device. However, the program product of this application is not limited to this. In this specification, the readable storage medium may be any tangible medium including or storing a program, and the program may be used by or in combination with an instruction execution system, apparatus, or device.

The readable signal medium may include a data signal propagated in a baseband or as part of a carrier, and stores readable program code. The propagated data signal may be in a plurality of forms, including but not limited to, an electromagnetic signal, an optical signal, or any suitable combination of the above. The readable signal medium may alternatively be any readable medium other than the readable storage medium. The readable medium may send, propagate, or transmit a program for use by or in combination with an instruction execution system, apparatus or component.

The program code included in the readable medium may be transmitted by using any appropriate medium, including but not limited to, via wireless transmission, a wire, a cable, radio frequency (RF) or the like, or any suitable combination of thereof.

The program code configured to execute the operations of this application may be written by using any combination of one or more programming languages. The programming languages include an object-oriented programming language such as Java and C++, and also include a conventional procedural programming language such as "C" language or similar programming languages. The program code may be completely executed on a user computing device, partially executed on a user device, executed as an independent software package, partially executed on a user computing device and partially executed on a remote computing device, or completely executed on a remote computing device or server device. For the case involving a remote computing device, the remote computing device may be connected to a user computing device through any type of network including a local area network (LAN) or a wide area network (WAN), or may be connected to an external computing device (for example, through the Internet by using an Internet service provider).

Although several units or subunits of the apparatus are mentioned in detailed description above, such division is exemplary but not mandatory. In fact, according to the implementations of this application, features and functions of two or more units described above may be specified in one unit. On the contrary, the features and functions of one unit described above may be further divided into a plurality of units to be specified.

In addition, although the operations of the method in this application are described in a specific order in the accompanying drawings, this does not require or imply that the operations have to be performed in the specific order, or all the operations shown have to be performed to achieve an expected result. Additionally or alternatively, some steps may be omitted, a plurality of steps may be combined into one step for execution, and/or one step may be decomposed into a plurality of steps for execution.

A person skilled in the art is to know that the embodiments of this application may be provided as a method, a system, or a computer program product. Therefore, this application may use a form of hardware only embodiments, software only embodiments, or embodiments with a combination of software and hardware. Moreover, this application may be in a form of a computer program product that is implemented on one or more computer-usable storage media (including but not limited to a disk memory, a CD-ROM, and an optical memory) that include computer-usable program code.

This application is described with reference to flowcharts and/or block diagrams of the method, the device (system), and the computer program product according to the embodiments of this application. It is to be understood that computer program instructions can implement each process and/or block in the flowcharts and/or block diagrams and a combination of processes and/or blocks in the flowcharts and/or block diagrams. The computer program instructions may be referred to as certain functional units or modules. These computer program instructions may be provided to a general-purpose computer, a dedicated computer, a computer specifically designed for the functionality of the disclosed method for making music recommendations, an embedded processor, or a processor of another programmable data processing device to generate a machine, so that the instructions executed by the computer or the processor of the another programmable data processing device generate an apparatus for implementing specified functions in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Although a plurality of embodiments of this application have been described, once a person skilled in the art know a basic creative concept, they can make other changes and modifications to these embodiments. Therefore, the appended claims are intended to cover the plurality of embodiments and all changes and modifications falling within the scope of this application.

Obviously, a person skilled in the art may make various modifications and variations to this application without departing from the spirit and scope of this application. The application is intended to cover these modifications and variations provided that these modifications and variations of this application fall within the scope of the claims of this application and their equivalent technologies.

What is claimed is:

1. A method for making music recommendations, performed by a server device, the method comprising:
obtaining a material for which background music is to be added, the material including an image set, and the image set including at least one frame of image;
determining at least one visual semantic tag of the material, the at least one visual semantic tag describing at least one characteristic of the material, by:
parsing content of the material;
performing visual semantic tag recognition on the content of the material by using a pre-trained tag recognition model to obtain visual semantic tag vectors of the content of the material; and
identifying visual semantic tags of which scores meet a preset screening condition among the visual semantic tag vectors as visual semantic tags corresponding to the content of the material,
wherein the visual semantic tag vectors of the material include the at least one visual semantic tag of the content of the material and a score corresponding to the at least one visual semantic tag, and
wherein the pretrained tag recognition model is pre-trained using a plurality of tag recognition samples, and the plurality of tag recognition samples each include a sample image and a visual semantic tag vector of the sample image;
identifying matched music matching the at least one visual semantic tag from a candidate music library;
sorting the matched music according to user assessing information of a user corresponding to the material;
screening the matched music based on a sorting result and according to a preset music screening condition; and
recommending matched music obtained through the screening as candidate music of the material.

2. The method according to claim 1, further comprising:
receiving indication information that is transmitted by a terminal device and that designates background music from the candidate music;
synthesizing the background music to the material according to the indication information; and
transmitting the material synthesized with music to the terminal device.

3. The method according to claim 1,
wherein the material includes a video.

4. The method according to claim 1, further comprising:
obtaining the matched music matching the at least one visual semantic tag based on the at least one visual semantic tag and by using a pre-trained music search model, wherein the music search model is obtained after text classification training is performed on music comment information of users for various music.

5. The method according to claim 1, further comprising:
sorting the matched music according to music assessing information of the user corresponding to the material for the matched music.

6. The method according to claim 5, further comprising:
obtaining, for the matched music, user attribute information of users assessing the matched music, and obtaining similar users according to the user attribute information of the user; and
obtaining the music assessing information of the user for the matched music according to music assessing information of the similar user.

7. The method according to claim 5, further comprising:
obtaining a score matrix based on actual according to the music assessing information of the similar users for the candidate music;
performing matrix decomposition on the score matrix, to obtain a user matrix and a music feature matrix; and
determining the music assessing information of the user according to the user matrix.

8. The method according to claim 1, further comprising:
sorting the matched music according to parameter values of music assessing behavior data of the user corresponding to the material for music, wherein the music assessing behavior data includes one or more of a music score, a click-through rate, a favorites behavior, a like behavior, and a sharing behavior.

9. A non-transitory computer storage medium storing computer program that, when being executed by a processor, cause the processor to perform:
obtaining a material for which background music is to be added, the material including an image set, and the image set including at least one frame of image;
determining at least one visual semantic tag of the material, each visual semantic tag describing at least one characteristic of the material, by:
parsing content of the material;
performing visual semantic tag recognition on the content of the material by using a pre-trained tag recognition model to obtain visual semantic tag vectors of the content of the material; and
identifying visual semantic tags of which scores meet a preset screening condition among the visual semantic tag vectors as visual semantic tags corresponding to the content of the material,
wherein the visual semantic tag vectors of the material include the at least one visual semantic tag of the content of the material and a score corresponding to the at least one visual semantic tag, and
wherein the pretrained tag recognition model is pre-trained using a plurality of tag recognition samples, and the plurality of tag recognition samples each include a sample image and a visual semantic tag vector of the sample image;
identifying matched music matching the at least one visual semantic tag from a candidate music library;
sorting the matched music according to user assessing information of a user corresponding to the material for the matched music; and
screening the matched music based on a sorting result and according to a preset music screening condition; and
recommending matched music obtained through the screening as candidate music of the material.

10. The storage medium according to claim 9, wherein the computer program further cause the processor to perform:
sorting the matched music according to music assessing information of the user corresponding to the material for the matched music.

11. The storage medium according to claim 10, wherein the computer program further cause the processor to perform:

obtaining, for the matched music, user attribute information of users assessing the matched music, and obtaining similar users according to the user attribute information of the user; and obtaining the music assessing information of the user for the matched music according to music assessing information of the similar user.

12. The storage medium according to claim 9, wherein the computer program further cause the processor to perform:

sorting the matched music according to parameter values of music assessing behavior data of the user corresponding to the material for music, wherein the music assessing behavior data includes one or more of a music score, a click-through rate, a favorites behavior, a like behavior, and a sharing behavior.

13. The storage medium according to claim 9, wherein the computer program further cause the processor to perform:

receiving indication information that is transmitted by a terminal device and that designates background music from the candidate music;

synthesizing the background music to the material according to the indication information; and transmitting the material synthesized with music to the terminal device.

14. The storage medium according to claim 9, wherein the computer program further cause the processor to perform:

obtaining the matched music matching the at least one visual semantic tag based on the at least one visual semantic tag and by using a pre-trained music search model, wherein the music search model is obtained after text classification training is performed on music comment information of users for various music.

15. The storage medium according to claim 11, wherein the computer program further cause the processor to perform:

obtaining a score matrix based on actual according to the music assessing information of the similar users for the candidate music;

performing matrix decomposition on the score matrix, to obtain a user matrix and a music feature matrix; and determining the music assessing information of the user according to the user matrix and the music feature matrix.

16. A computing device, comprising at least one processor and at least one storage medium, the storage medium storing a computer program, the program, when executed by the processor, causing the processor to perform:

obtaining a material for which background music is to be added, the material including an image set, and the image set including at least one frame of image;

determining at least one visual semantic tag of the material, the at least one visual semantic tag describing at least one characteristic of the material, by:

parsing content of the material;

performing visual semantic tag recognition on the content of the material by using a pre-trained tag recognition model to obtain visual semantic tag vectors of the content of the material; and identifying visual semantic tags of which scores meet a preset screening condition among the visual semantic tag vectors as visual semantic tags corresponding to the content of the material, wherein the visual semantic tag vectors of the material include the at least one visual semantic tag of the content of the material and a score corresponding to the at least one visual semantic tag, and wherein the pretrained tag recognition model is pre-trained using a plurality of tag recognition samples, and the plurality of tag recognition samples each include a sample image and a visual semantic tag vector of the sample image;

identifying matched music matching the at least one visual semantic tag from a candidate music library;

sorting the matched music according to user assessing information of a user corresponding to the material;

screening the matched music based on a sorting result and according to a preset music screening condition; and recommending matched music obtained through the screening as candidate music of the material.

17. The computer device according to claim 16, wherein the processor is further configured to perform:

receiving indication information that is transmitted by a terminal device and that designates background music from the candidate music;

synthesizing the background music to the material according to the indication information; and transmitting the material synthesized with music to the terminal device.

18. The computer device according to claim 16, wherein the material includes a video.

19. The computer device according to claim 16, wherein the processor is further configured to perform:

obtaining the matched music matching the at least one visual semantic tag based on the at least one visual semantic tag and by using a pre-trained music search model, wherein the music search model is obtained after text classification training is performed on music comment information of users for various music.

20. The computer device according to claim 16, wherein the processor is further configured to perform:

sorting the matched music according to parameter values of music assessing behavior data of the user corresponding to the material for music, wherein the music assessing behavior data includes one or more of a music score, a click-through rate, a favorites behavior, a like behavior, and a sharing behavior.

* * * * *